Jan. 26, 1971　　　　T. S. WRIGHT　　　　3,559,062
RADIAL READOUT GAUGE HAVING COOPERATING VISUAL
AND AUTOMATIC SIGNIFICATION MEANS
Filed Nov. 19, 1968　　　　　　　　　　　　2 Sheets-Sheet 1
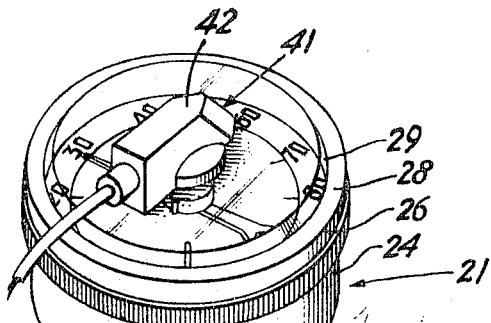
FIG. 1.
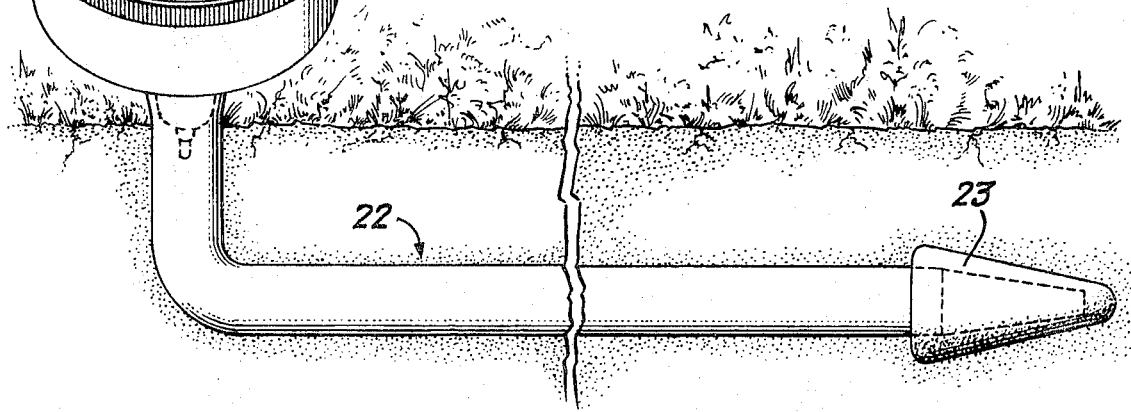
FIG. 5.
FIG. 2.
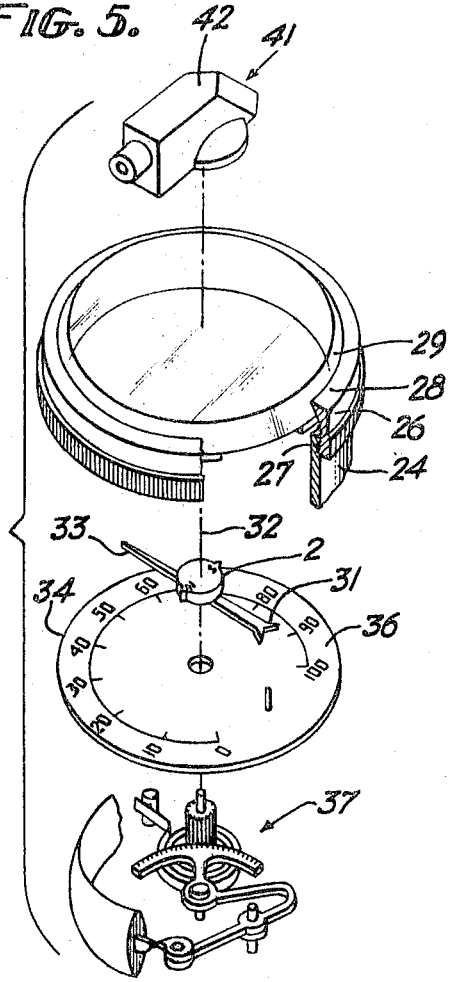
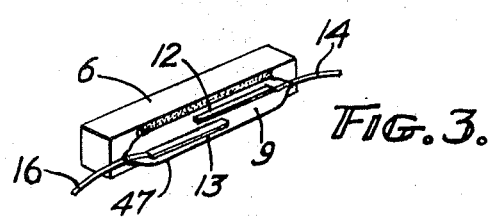
FIG. 3.
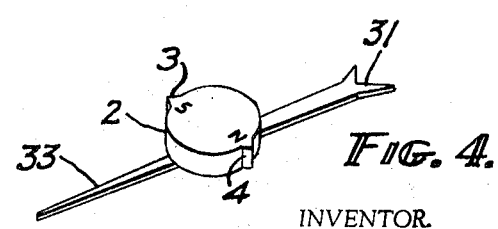
FIG. 4.
INVENTOR.
THOMAS S. WRIGHT
BY
John J. Leavitt Jan. 26, 1971 — T. S. WRIGHT — 3,559,062
RADIAL READOUT GAUGE HAVING COOPERATING VISUAL
AND AUTOMATIC SIGNIFICATION MEANS
Filed Nov. 19, 1968 — 2 Sheets-Sheet 2

ACTUATION "ON"

ACTUATION "OFF"

INVENTOR.
THOMAS S. WRIGHT
BY
John J. Leavitt

United States Patent Office 3,559,062
Patented Jan. 26, 1971

3,559,062
RADIAL READOUT GAUGE HAVING COOPERATING VISUAL AND AUTOMATIC SIGNIFICATION MEANS
Thomas S. Wright, 6013 Monteverde Drive,
San Jose, Calif. 95120
Filed Nov. 19, 1968, Ser. No. 777,053
Int. Cl. G01d 13/26
U.S. Cl. 324—157                    8 Claims

ABSTRACT OF THE DISCLOSURE

Presented is a method and means for converting a radial readout gauge which normally indicates values only for visual observation to a radial readout gauge which combines visual observation of a value signified by the gauge with automatic signification of the attainment of a selected value on the gauge through electrical means.

BACKGROUND OF INVENTION

Radial type readout gauges are the type that display a flat dial face having values or other indicia arranged in a scale around the outer periphery of the dial face, the values or indicia on the dial face being correlated to a parameter being monitored, and to which parameter the radial readout gauge is connected in some convenient manner; for instance, in measuring the content of moisture in soil a dial face calibrated to represent the degree of moisture in the soil is utilized, and the radial readout gauge is provided with a rotatable pointer adapted to sweep across the scale to indicate the amount of moisture determined by a probe extending into the ground. Conventionally, it is required to visually observe the position of the pointer with respect to the dial face to determine the degree of moisture in the ground.

Other types of radial readout gauges may be utilized to signify various quantitative and qualitative parameters which it is desired be continuously monitored, with the condition of the parameter being monitored being indicated on a visually observable radial readout gauge embodying a scale of appropriate indicia adapted to be swept by a pointer the position of which is correlated to the condition of the parameter being monitored.

All such conventional radial readout gauges possess the disadvantage that before the condition of the parameter being monitored can be known, it is necessary that a person in attendance visually observe the reading of the pointer in relation to the scale and make a judgment with respect to whether or not remedial action need be taken with respect to control of the parameter being monitored. It is one of the objects of the invention to provide method and means in a radial readout gauge obviating the necessity of visual observation of the gauge and providing for the automatic initiation of remedial action when a predetermined deleterious value of the condition monitored by the gauge has been reached.

Even though today's technology has provided many different means and methods for effective control of parameters without the necessity of visually observable radial readout gauges, many such conventional radial readout gauges are still in use and more are being incorporated into many different industrial applications. Accordingly, it is another object of the invention to provide a method and means of converting existing radial readout gauges to gauges which may simultaneously provide visual observation of a condition being monitored with automatic signification of the attainment of a deleterious condition in the parameter being monitored.

Radial readout gauges are normally fabricated with scales divided into separate sections, one section being correlated to a normal condition in the parameter being monitored, while another section is correlated to an abnormal condition in the parameter being monitored which requires that remedial action be taken to correct the condition. Many such parameters, such as heat and pressure, may rise so rapidly that the pointer sweeps from a normal condition to an abnormal condition in the space of a few seconds. When such gauges are dependent upon visual observation to effect remedial action, it is obvious that the deleterious condition can only be discovered by constant visual observation of the gauge. Even so, the deleterious value in the condition may be reached before the attendant observes the condition and takes remedial action. Accordingly, it is a still further object of the invention to convert a conventional radial readout gauge by the addition of a pair of magnets, an electrical switch and an auxiliary selector means by which a specific value or indicia on the gauge scale may be preselected so that when that preselected condition is signified by the modified pointer of the radial readout gauge, remedial action will automatically be taken to correct the condition, or the attendant will be warned that a dangerous condition exists.

The invention possesses other objects and features of advantage, some of which, with the foregoing, will be apparent from the following description and the drawings. It is to be understood however that the invention is not limited by said description and drawings but may be embodied in various forms within the scope of the appended claims.

BRIEF SUMMARY OF DISCLOSURE

In terms of broad inclusion, the method and means forming the subject matter of this invention comprises a radial readout gauge having a scale designating values or conditions of parameters being monitored. Specific conditions or values on the scale, correlated to the parameter being monitored, are signified by a pointer arranged to rotate about a suitable axis and sweep the scale to indicate the value or condition which at any given moment is correlated to the parameter being monitored. Rotation of the pointer is effected through appropriate means interconnecting the pointer with the parameter being monitored. Mounted for rotation with the pointer is a control magnet the poles of which are perpendicular to the pointer so that the axis of the magnetic field through the poles is in general perpendicular to the axis of the pointer.

Axially spaced from the pointer and the control magnet along the axis of rotation thereof is an auxiliary selector adapted to be rotated in relation to the pointer-control magnet subassembly. Mounted on the auxiliary selector and rotatable therewith in relation to the pointer-control magnet subassembly, is polarizing magnet having poles in general alignment with the longitudinal axis of the auxiliary selector, so that the axis of the magnetic field between the poles of the polarizing magnet is generally in alignment with the axis of the auxiliary selector. Operatively associated with the polarizing magnet and the auxiliary selector is an electric switch the terminals of which may be connected to any appropriate control circuit.

In operation, the auxiliary selector with its polarizing magnet and electric switch is rotated to indicate a predetermined value and locked in relation to the scale. The auxiliary selector points to a value on the scale correlated to a value or condition of the parameter being monitored which it is desired be signified electrically when the pointer of the gauge also points to the selected value. Variations in the condition or value of the parameter being monitored will effect a correlated degree of rotation of the pointer, and when the axis of the pointer with its attendant control magnet aligns itself with the axis of the auxiliary selector and the polarizing magnet associated therewith and with the electric switch, the contacts of the electric switch will be opened or closed to effect electrical signification that the pre-selected value has been reached.

DESCRIPTION OF THE DRAWINGS

FIG. 1 is a perspective view partly in vertical section illustrating the invention embodied in an automated soil tensiometer. The gauge pointer and auxiliary selecter are shown set perpendicular to each other.

FIG. 2 is a cross-sectional view taken along the longitudinal axis of the auxiliary selector and illustrating the relationship between the auxiliary selector, the transparent cover plate of the dial gauge, the electric switch, and polarizing magnet associated with the auxiliary selector.

FIG. 3 is a fragmentary perspective view illustrating the relationship between the electric switch and polarizing magnet associated therewith.

FIG. 4 is a fragmentary perspective view illustrating the relationship between the pointer and control magnet associated therewith.

FIG. 5 is a perspective view in enlarged scale illustrating the internal mechanism of the radial readout gauge which converts a value of a condition being monitored to rotary displacement of the pointer in relation to the dial face. Portions of the housing have been broken away to show the underlying structure.

DESCRIPTION OF PREFERRED EMBODIMENT

To provide a better understanding of the principle on which the radial readout gauge having cooperating visual and automatic signification means forming the subject matter of the invention operates reference is made to FIGS. 6 through 13 which illustrate schematically the effect on a magnetically responsive switch of magnetic lines of force resulting from specific relationships between the control and polarizing magnets.

Figure 6:
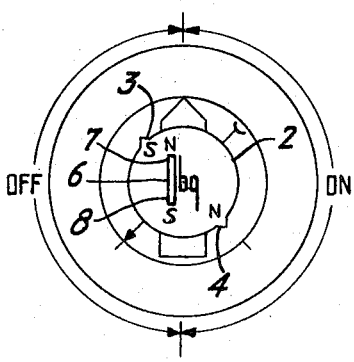
FIG. 6 is a schematic view illustrating a control magnet and polarizing magnet in superposed relation, and indicating the effect on associated normally-open magnetically responsive switch contacts of rotation of the control magnet 45° counterclockwise so as to increase the gap between the north pole of the polarizing magnet and the south pole of the control magnet. The switch is in "OFF" condition.
Figure 7:
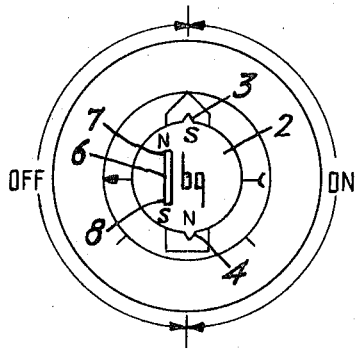
FIG. 7 is a schematic view similar to FIG. 6, but showing the axes of the magnets in alignment with the north pole of the polarizing magnet associated with the south pole of the control magnet. The switch remains "OFF."
Figure 8:
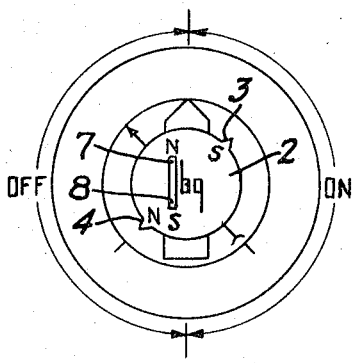
FIG. 8 is a schematic view similar to FIG. 6, but showing the control magnet rotated 45° clockwise from the position illustrated in FIG. 7. The switch remains "OFF."

Referring specifically to FIG. 6, a control magnet designated generally by the numeral 2 is provided with opposite poles 3 and 4 and is arranged in relation to a polarizing magnet designated generally by the numeral 6 and having opposed poles 7 and 8. For purposes of clarity in the description, the magnet 2 may variously be described as a ring magnet polarized transverse to its central axis or as a control magnet in relation to the magnet 6, the latter magnet constituting a polarizing magnet and being polarized so that the axis of its magnetic field is coincident with the longitudinal axis of the magnet itself.

Figure 11:
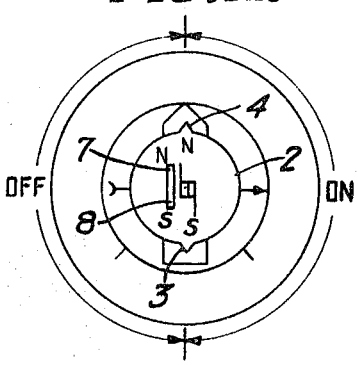
FIG. 11 is a schematic view similar to FIG. 6, but showing the control magnet rotated clockwise 90° beyond the closing position illustrated in FIG. 9. In contrast to FIG. 7, this view also shows the axes of the magnets in alignment, but with like poles of the two magnets in close association. The switch remains "ON."
Figure 12:
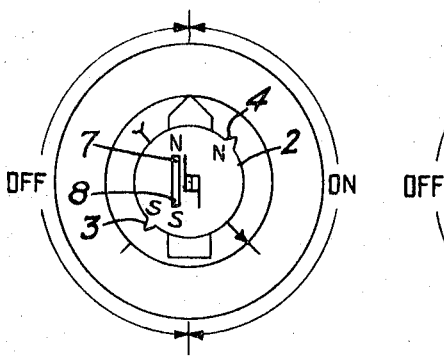
FIG. 12 is a schematic view similar to FIG. 6 but showing the control magnet rotated clockwise 135° beyond the closing illustrated in FIG. 9. The switch remains "ON."

With respect to each other, the magnets 2 and 6 may be oriented as indicated in FIG. 11, in which the north poles of the polarizing magnet and control magnet lie closely adjacent to each other with the axes of the magnetic fields in parallel alignment so that the magnetic fields of these two magnets produce a mutually repelling effect which causes a relatively wide and well-defined dispersal of the magnetic lines of force in regions surrounding the magnets. It is to be expected that this orientation of the magnets will produce a maximum closing or opening force on an associated magnetically responsive reed switch. Such force is effective through arcs of rotation of about 90° on opposite sides of this position. In FIGS. 6 through 13, the magnets 2 and 6 have been rotated relative to each other in forty-five degree increments and the effect of the changing magnetic forces shown on associated switch contacts as hereinafter explained.

It has been found that by controlling the rotary relationship between these two magnets it is possible to control the closing or opening action of the associated electric switch, preferably a reed-type switch as illustrated schematically in FIGS. 6 through 13, and in FIGS. 2 and 3. The reed-type switch is provided with an enclosing glass envelope 9 within which are located a pair of contacts 12 and 13. The contact 12 is connected by a lead 14 extending exteriorly of the envelope 9, while the contact 13 is connected by a lead 16 extending exteriorly of the envelope. Both leads are adapted to be connected to whatever type of control circuit is intended to be controlled by opening and closing action of the contacts of the switch 9.

There are of course many different configurations of reed switches. The construction of the reed switch per se forms no part of the subject invention, except that it is essential that the contacts 12 and 13 be responsive in a predetermined manner to the associated magnetic fields. A closed differential-type magnetic switch is preferable so that hysteresis developed by reversal of rotation of the pointer is minimized. It will thus be apparent that by properly orienting the reed switch in relation to the control magnet and the polarizing magnet, the contacts of the reed switch may be made to open or close at any selected setting, determined by the relationship which the control magnet bears to the polarizing magnet, and the interaction of their magnetic fields with the magnetically responsive reed switch.

The application of the principles discussed above in connection with FIGS. 6 through 13 are exemplified and applied to the moisture probe structure illustrated in FIGS. 1 through 5. As there shown, the moisture probe includes a dial housing portion designated generally by the numeral 21, and having a hollow tubular probe portion designated generally by the numeral 22. The probe portion is adapted to be inserted into the ground and is provided with a moisture-permeable tip portion 23.

After insertion in the ground, the probe is filled with water and the housing is pressed onto the end of the tubular probe remote from tip 23. It is important that the water completely fill the probe so no air space is provided within the tubular probe. Depending on the moisture content of the earth in which the probe is buried, water from the probe will be absorbed by the surrounding soil, thus creating a vacuum or negative pressure in the probe, or moisture from the soil will permeate the tip and flow into the probe, thus tending to increase the pressure within the probe. These variations in pressure are reflected by the gauge as a deficiency or excess of moisture in the soil.

The dial housing portion 21 is provided with a cylindrical metallic portion 24 provided with a ring clamp 26 at its upper end adapted to threadably engage the upper threaded end 27 of the housing 21. The ring clamp is provided with a radially inwardly extending flange 28 under which and between the edge of housing 21 is releasably clamped a transparent face plate 29.

Within the metallic housing, underlying the transparent face plate 29, is a pointer 31 mounted for rotation about a central rotational axis 32 so that the end 33 of the pointer sweeps the face of a dial 34 around the outer peripheral edge of which is printed or otherwise disposed a suitable scale 36 indicating a range of values corresponding to values of a parameter being monitored, in this instance being correlated to the amount of moisture in the soil. Rotation of the pointer in correlation to variations in the amount of moisture present in the soil is effected by the drive mechanism designated generally by the numeral 37 shown best in FIG. 5.

Associated with the pointer, and also rotatably disposed with respect to the rotational axis of the pointer is a control magnet 2, shown best in FIGS. 4 and 5 as being an annular wafer magnet having the characteristics of a bar magnet; that is, being polarized across its diameter so that one pole on the peripheral edge of the magnet constitutes a north-seeking pole while the other opposite periphery of the wafer is polarized in opposite sense. The pointer and control magnet may be fastened together for simultaneous rotation by any suitable means. In FIG. 4, the pointer is illustrated as a support member upon which the control magnet is superposed over the axis of rotation of the pointer. Preferably, for use in the tensiometer illustrated in FIG. 1, an axis through the north and south poles of the magnet lies perpendicular to the longitudinal axis of the pointer as illustrated best in FIG. 4.

Mounted on the transparent face plate 29 is an auxiliary selector designated generally by the numeral 41, and including a body portion 42 having a nose portion 43 and an indexing groove 44 adapted to lie adjacent to the peripheral scale 36 on the dial 34 when the selector is in proper position. The selector body is preferably secured by any suitable means to the transparent face plate 29, as by a layer of contact cement illustrated at 45. Mounted within the selector body, which is preferably fabricated from an electrically nonconductive material such as one of the synthetic resins, is the reed switch 9 previously discussed which includes switch contacts 12 and 13, connected by leads 14 and 16 to an appropriate terminal designated generally by the numeral 46. The terminal may be connected in any conventional manner with an electrical circuit intended to be controlled by the opening and closing action of the reed switch 9. As shown best in FIGS. 2 and 3, the reed switch includes a glass envelope 47 which hermetically encloses the switch contacts 12 and 13 to insure cleanliness and reliability in the operation of the switch.

Figure 9:
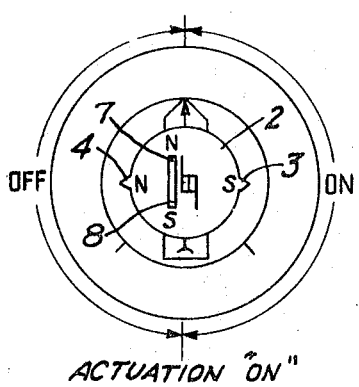
FIG. 9 is a schematic view similar to FIG. 6, but showing the control magnet rotated 90° clockwise from the position shown in FIG. 7 so as to place the axes of the magnets perpendicular to each other to effect actuation of the switch to "ON" condition. With the axes of the magnets so related, the axes of the pointer and auxiliary selector are in substantial alignment as shown. Switch actuated "ON."
Figure 10:
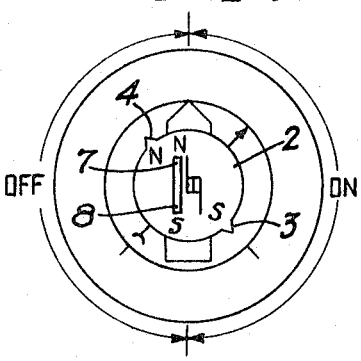
FIG. 10 is a schematic view similar to FIG. 6, but showing the control magnet rotated clockwise 45° beyond the closing position illustrated in FIG. 9. The switch remains "ON."
Figure 13:
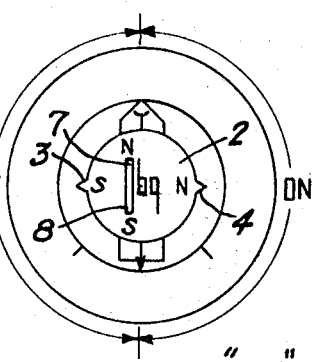
FIG. 13 is a schematic view similar to FIG. 6, but showing the control magnet rotated clockwise 180° beyond the closing position illustrated in FIG. 9 so as to again place the axes of the two magnets perpendicular to each other to effect actuation of the switch to an "OFF" condition.

Mounted closely adjacent to the envelope of the reed switch is the polarizing magnet 6 shown best in FIGS. 2 and 3. The polarizing magnet is preferably adjusted longitudinally with respect to the switch contacts 12 and 13 so as to compensate for variations in the magnetic strengths of different magnets. The optimum position is that which insures substantially equal arcs of revolution of 180° on opposite sides of the aligned axes of the pointer and selector as shown in FIGS. 9 and 13. It will thus be seen that the configuration of the reed switch contacts may be arranged either for normally open operation or normally closed operation, depending upon the parameter being monitored, merely by re-positioning the polarizing magnet end-for-end in relation to the control magnet.

With reference to FIG. 2, for optimum operation, the longitudinal axis of the reed switch is preferably in parallel alignment with the longitudinal axis of the selector 41, and with respect to the central rotational axis 32, the contacts 12 and 13 are symmetrically disposed so as to effectively rotate thereabout as a rotational axis when the selector 41 is rotated. Satisfactory results have been achieved when the reed switch is shifted longitudinally so as to place the switch contacts off-center.

Inasmuch as the selector 41 is secured to the transparent face plate 29, and inasmuch as the face plate is selectively locked to the upper edge of the cylindrical housing, it is clear that the transparent face plate may be released for rotation by loosening the ring clamp 36. The selector may then be rotated about the central axis so that the index 44 on the selector points to any selected value on the scale. Such selected value will normally correspond to a condition or value correlated to the parameter being monitored which should be called to the attention of an attendant, or the attainment of which value should automatically trigger a predetermined remedial action controlled by operation of the reed switch.

In operation, the reed switch mounted in the selector is electrically connected by any suitable means such as conductive leads (not shown) to an alarm system or light or other controlled circuit adapted to respond to attainment of a selected value. The selector is then adjusted to point to the selected value and the ring clamp is tightened to lock the selector in this position. It should be kept in mind that the axis of the magnetic field generated by the polarizing magnet will also be lined up with the selected value. Assuming the switch contacts are normally open, such contacts will remain open until closed by a properly oriented magnetic field. The positions of actuation of the switch to "ON" and "OFF" conditions are clearly shown in FIGS. 9 and 13, respectively. For all positions of the pointer through an arc of 180° counterclockwise from the position of the pointer in FIG. 9, the contacts will be in "OFF" condition. For all positions of the pointer through an arc of 180° clockwise from the position of the pointer in FIG. 9, the contacts will be in "ON" position.

In the position of the parts illustrated in FIG. 1, the axis of the magnetic field generated by the control magnet is effectively in spaced parallel alignment with the axis of the magnetic field generated by the polarizing magnet. This results from the fact that the longitudinal axis of the pointer is perpendicular to the axis of the control magnetic field, and the axis of the polarizing magnet is in parallel alignment with the selector, the long axis of which is aligned with the axis of the control magnetic field in the position of the parts shown in FIGS. 1 and 5. This relationship is shown schematically in FIG. 7.

During continuous monitoring of the parameter, if the value of the condition being monitored carries the pointer into parallel alignment with the axis of the selector (FIG. 9), it will be clear that the magnetic axis of the control magnet will be perpendicular to the magnetic axis of the polarizing magnet. When this occurs, the magnetic fields of the two magnets in the region of the magnetically responsive contacts will effect the desired closing of the contacts to complete a circuit through an alarm or other controlled circuit. The switch contacts will remain closed during continued rotation of the pointer through an arc of approximately 180° measured from the point where the contacts close. If an attendant is present, he need only take whatever remedial action is required if such remedial action has not been initiated automatically by the closing of the switch contacts.

From the foregoing it will be apparent that the method and means forming the subject matter of the invention may be applied to existing radial readout gauges simply by associating the control magnet with the existing pointer in the radial readout gauge and by applying the selector, with associated polarizing magnet and reed switch, on the transparent face of the standard dial gauge. Thereafter, the radial readout or dial gauge may be used or applied in conventional manner to whatever equipment is desired.

Having thus described my invention, what is claimed to be novel and sought to be protected by letters patent is as follows:

I claim:

1. A radial readout gauge having cooperating visual and automatic signification means comprising:
   (a) a housing enclosing a dial face having a graduated scale indicating a range of values of a varying condition to be monitored;
   (b) a pointer pivoted for rotation about a central axis and adapted to sweep across said scale to correlate the value of the condition monitored at any given moment with a value indication on said scale;
   (c) means responsive to variations of said condition for effecting rotation of the pointer in relation to said scale;
   (d) a control magnet mounted for rotation with said pointer relative to said scale, the poles of said control magnet lying so that the axis of the magnetic field between said poles is perpendicular to said pointer;
   (e) a polarizing magnet mounted for rotation relative to said control magnet and said scale, the poles of said polarizing magnet lying so that the axis of the magnetic field between the poles of said polarizing magnet is selectively angularly displaceable with respect to the axis of the magnetic field between the poles of said control magnet;
   (f) selector means on the housing selectively rotatable about said central axis to select a predetermined value on the scale and to align the axis of said polarizing magnet with the selected value;
   (g) electric switch means mounted in association with said selector means and said polarizing magnet and responsive to the magnetic field about said control magnet in cooperation with the magnetic field about said polarizing magnet to open or close said switch means when the pointer has swept across the scale to said predetermined value indicated by said selector means, whereby said closed or open condition is maintained for a predetermined arc of approximately 180° beyond said selected value.

2. The combination according to claim 1, in which said pointer and said control magnet are mounted within the housing and said selector means and polarizing magnet are mounted outside said housing.

3. The combination according to claim 1, in which said graduated scale is within said housing, a transparent cover plate closes said housing at one end so that said scale is visible through said transparent cover plate, and said selector means, polarizing magnet and associated switch means are mounted on said housing in association with said transparent cover plate.

4. The combination according to claim 1, in which said switch means constitutes a reed-type switch the contacts of which are responsive to a magnetic field to effect closing or opening action thereof.

5. The combination according to claim 1, in which said housing includes a transparent cover plate, selectively adjustable clamp means releasably securing said cover plate to said housing to permit selective rotation of said transparent cover plate in relation to said scale, and said selector means, polarizing magnet and switch means are mounted on said transparent cover plate for selective rotation therewith.

6. The combination according to claim 1, in which said switch means is responsive to the cumulative effect of the magnetic fields created by said control and polarizing magnets to effect closing or opening action of said switch means.

7. The combination according to claim 1, in which said polarizing magnet is mounted in close association with said switch means whereby said switch means and polarizing magnet are rotatable in unison about the central axis.

8. The combination according to claim 1, in which said control and polarizing magnets are oriented in respect to a central axis and to each other whereby for approximately one-half the arc of rotation of the magnetic fields created by said magnets the associated switch will be in an "OFF" condition and for the remaining half of the arc of rotation of the magnetic fields the associated switch will be in an "ON" condition.

References Cited

UNITED STATES PATENTS

| | | | |
|---|---|---|---|
| 2,435,027 | 1/1948 | Blomberg | 324—157X |
| 2,536,806 | 1/1951 | Hansen | 324—157X |
| 3,452,170 | 6/1969 | Conkling | 335—205X |

ALFRED E. SMITH, Primary Examiner

U.S. Cl. X.R.

335—205